Aug. 23, 1949.  W. F. TRIPLETT  2,479,794
REVERSING GEAR FOR LOCOMOTIVES
Filed Oct. 23, 1944  2 Sheets-Sheet 1
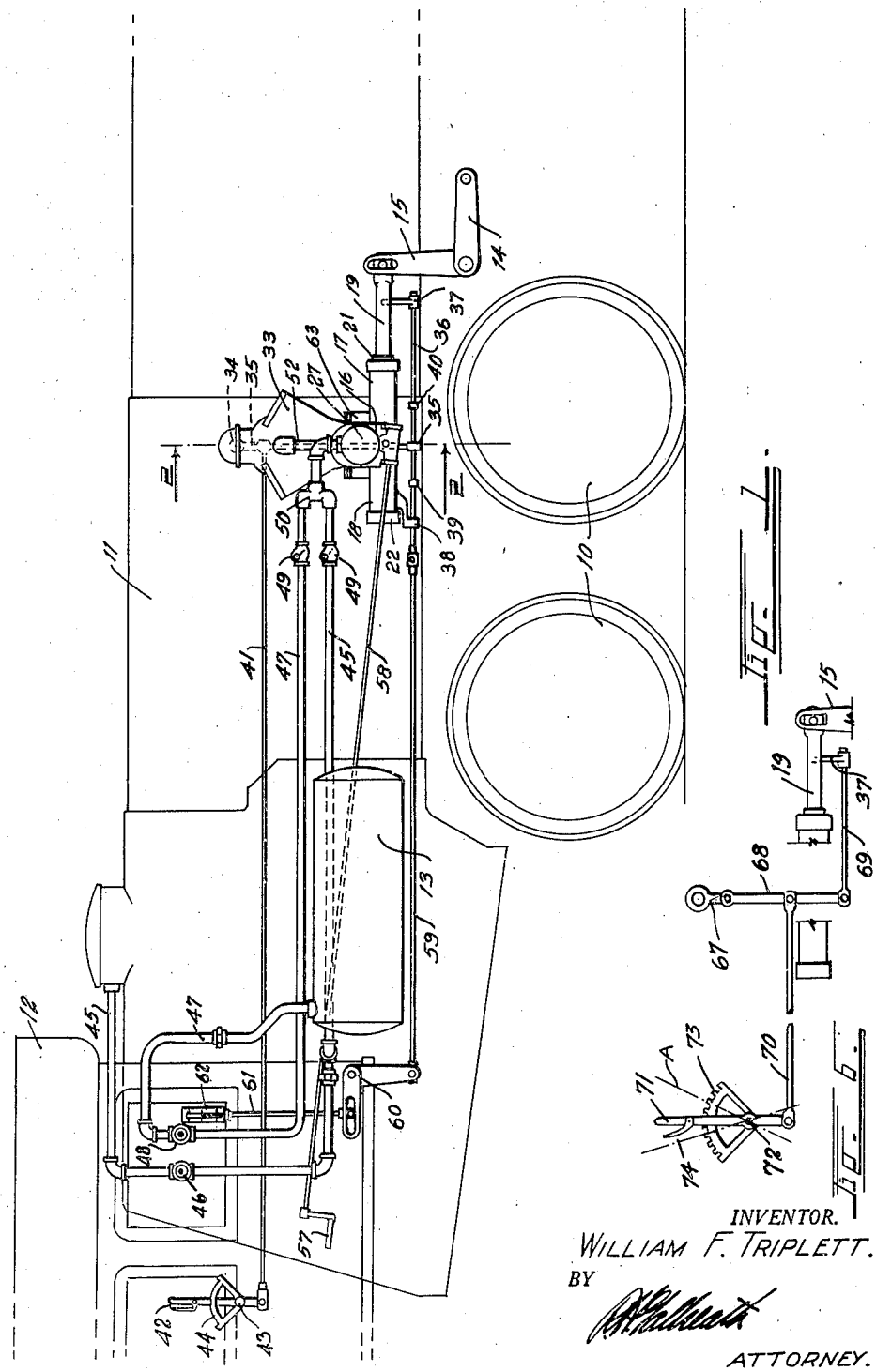
INVENTOR.
WILLIAM F. TRIPLETT.
BY
ATTORNEY.

Aug. 23, 1949.  W. F. TRIPLETT  2,479,794
REVERSING GEAR FOR LOCOMOTIVES
Filed Oct. 23, 1944  2 Sheets-Sheet 2
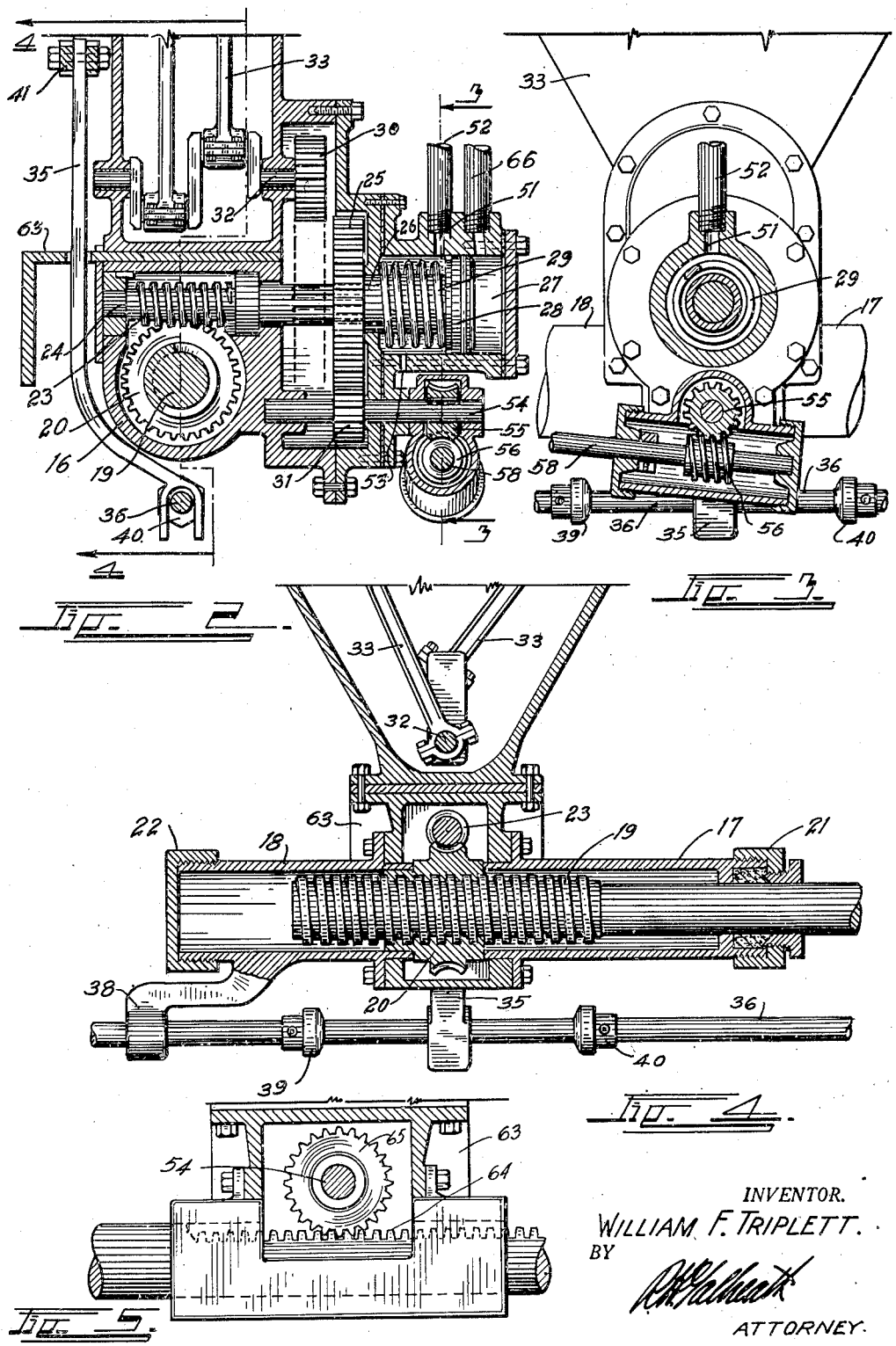
INVENTOR.
WILLIAM F. TRIPLETT.
BY
ATTORNEY.

Patented Aug. 23, 1949

2,479,794

UNITED STATES PATENT OFFICE 2,479,794

REVERSING GEAR FOR LOCOMOTIVES

William F. Triplett, Grand Junction, Colo.

Application October 23, 1944, Serial No. 559,996

7 Claims. (Cl. 121—39)

This invention relates to a power-operated reversing gear for locomotives, and has for its principal object the provision of a safe, easily operated and positive mechanism for replacing the usual hand-operated reverse lever.

Another object of the invention is to construct the device so that it can be operated by either air or steam pressure at the will of the engineer, and to provide means which will automatically connect the reversing mechanism with a manual mechanism should both the steam and air pressure fail so that operation thereof will be under the control of the engineer at all times and under all conditions.

Still another object is to provide a power-operated mechanism which will not "creep", and which will accurately maintain its setting until a change is desired.

A further object is to provide a device of this character which can be connected with any of the standard reversing gears at present used upon locomotives without change therein and with a minimum of installation expense.

A still further object is to provide an easily operated manual adjustment which may be used in the locomotive shop for accurately presetting the valves.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a diagrammatic phantom view of a locomotive illustrating the position of the invention thereon;

Fig. 2 is an enlarged vertical section through the actuating device taken on the line 2—2, Fig. 1;

Fig. 3 is a detail cross section through the gear actuating cylinder of the device, taken on the line 3—3, Fig. 2;

Fig. 4 is a longitudinal section taken on the line 4—4, Fig. 2;

Fig. 5 is a similar section illustrating an alternate form of the invention in which the actuating jack screw and nut of the first form is replaced by a rack and pinion.

Fig. 6 is a diagrammatic view illustrating an alternate arrangement for controlling the improved reverse from the cab of the locomotive.

In Fig. 1 the parts of a typical locomotive are indicated by numerals as follows: wheels 10, boiler 11, cab 12, air receiver 13, fork shaft 14, and fork lever 15. The invention is designed to be positioned at the right side of the boiler 11 to the rear of the fork lever 15 upon any suitable supporting bracket 63.

The improved, power-operated reversing device employs a gear housing 16 from which a front screw tube 17 projects forwardly and a rear screw tube 18 projects rearwardly. The screw tubes 17 and 18 are in axial alignment with each other on opposite sides of the housing 16. A threaded jack screw 19 is axially mounted in these tubes and passes through the housing 16. A nut gear 20, of the worm type, is threaded on the jack screw 19 within the housing 16 so that rotation of the nut gear 20 in either direction will cause the jack screw 19 to travel longitudinally in the tubes 17 and 18 in either direction.

The forward extremity of the jack screw is connected to the standard fork lever 15 in place of the usual reverse lever connecting rod. The forward extremity of the tube is closed by means of a suitable packing gland and gland nut 21 to retain lubricant and prevent the entrance of dirt. The rearward extremity of the tube 18 is closed by means of a cap 22.

The nut gear 20 is rotated through the medium of a worm 23 mounted on a worm shaft 24 extending transversely of the housing 16. A shifting gear 25 is splined on the worm shaft 24 so that it can be moved longitudinally therof by means of a shaft sleeve 26. The shaft sleeve 26 extends into a pressure cylinder 27 and terminates therein in a piston 28. The piston 28 is constantly urged outwardly by means of a compression spring 29 and is forced inwardly by means of pressure in the cylinder 27.

When under the influence of the pressure, the shifting gear 25 is forced into mesh with a drive gear 30, and when under the influence of the spring 29 the gear 25 is forced into mesh with a manual gear 31.

The drive gear 30 is mounted on a motor shaft 32, driven from a pressure motor 33. The motor 33 may be of any of the usual types. A V type motor, such as used for operating air hoists and the like, has been found particularly valuable for this service. Such a motor is provided with a rotatable valve stem 34, which, when in its intermediate position closes off the supply to the motor, and when rotated to either side of this intermediate position operates the motor in either direction. In adapting such a motor for this use a control valve lever 35 is mounted on the stem 34 and extends downwardly therefrom to a position below the jack screw 19 to a control rod 36.

The forward extremity of the control rod 36 is connected to the forward extremity of the jack screw 19 by means of a suitable bracket arm 27. The rearward extremity of the control rod slides through a guide 38 supported from the rear tube 18. Thus the rod 36 will move in unison with the jack screw 19. The rod 36 is provided with a reverse stop nut 39, and a forward stop nut 40. These nuts can be pre-set in any desired positions along the rod so that they will alternately contact the control valve lever 35 at the extremes of movement of the jack screw 19.

A connecting rod 41 is connected to the lever 35 and extends rearwardly into the cab 12 to a connection with the lower extremity of a reversing lever 42 within reach of the engineer. The reversing lever is pivoted at 43 in a suitable quadrant 44, having a central notch for locking the lever 42 at the middle or neutral position. The lever cannot be locked in any other position.

Steam may be supplied to the motor 33 through a steam line 45 leading from the steam dome of the boiler and controlled in the cab 12 by means of a steam valve 46. Air may be supplied to the motor 33 from the air receiver 13 through an air line 47 controlled in the cab by means of an air valve 48. The air and steam lines 45 and 47 are provided with check valves 49 which prevent reverse flow therein from the motor 33. Thus, when the steam line is in use, steam cannot flow into the air line and vice versa.

Both lines 45 and 47 terminate in a header 50 leading to the head of the cylinder 27. A port 51 in the wall of the cylinder communicates with a motor feed pipe 52 which conducts pressure to the control valve of the motor 33. The port 51 is so positioned that it will be opened by the piston 28 after the latter has engaged the gears 25 and 30 and will be closed by the piston before these gears are disengaged. Therefore, the gears 25 and 30 are always in mesh before the motor 33 starts.

Whenever both the air and steam are cut off the pressure in the cylinder 27 will drop, allowing the spring 29 to force the piston outwardly to disengage the gear 25 from the gear 30 and bring the former into mesh with the manual gear 31. A bleed hole 53 is provided in the cylinder to allow pressure to escape from the rear of the piston to allow the pressure on the front thereof to freely move the piston.

The manual gear is mounted on a gear shaft 54 which can be rotated manually in any desired manner. As illustrated, the shaft 54 is rotated through the medium of a worm gear 55 which is in constant mesh with a driven worm 56 which can be rotated from a hand crank 57 in the cab through a torque rod 58.

Some means must be provided to indicate to the engineer the setting of the reverse gear. This is accomplished in the present invention by running a reach rod 59 rearwardly from the extremity of the control rod 36 to a bell crank lever 60 which operates an indicating rod 61. The upper extremity of the indicating rod indicates the position of the jack screw on a suitable scale 62 in the cab.

Operation

Let us assume that it is desired to reverse the locomotive. The engineer pulls the reverse lever 42 rearwardly from the "neutral" position. This causes the air motor 33 to operate in reverse direction so as to cause the nut gear 20 to pull the jack screw 19 rearwardly. The amount of rearward movement is noted by the engineer on the scale 62. When the desired valve setting has been reached he pushes the reverse lever 42 back to "neutral." Should he neglect to return the lever 42 to "neutral," the stop nut 39 will eventually contact the control valve lever 35 and push it to the "neutral" or closed position so as to stop the motor 33.

To obtain a forward setting, the reverse procedure is employed, that is, the engineer pushes reversing lever 42 forwardly to start the motor 33 in a forward direction. This causes the screw shaft 19 to push the fork lever 15 forwardly. When the desired valve setting is indicated on the scale 62, the lever 42 is returned to "neutral" and the motor is stopped at the desired point.

Should the air fail, the engineer can turn steam to the device through the valve 46 and should both the air and steam fail, the shifting gear 25 will move into mesh with the manual gear 31 and the hand crank 57 can be manually rotated to obtain the desired valve setting.

When the locomotive is in the shop with no air or boiler pressure the device can be operated by the hand crank for adjusting and setting purposes.

Alternate constructions

In Fig. 5 the jack screw of the previously described form is replaced by a toothed rack 64 which is connected at its forward extremity to the fork lever 15 as in the previous form. The worm 23 is replaced by a pinion 65, the teeth of which are in constant mesh with the teeth of the rack. The pinion is mounted on the worm shaft 24. The operation is exactly the same as the previous form except the action of the rack and pinion, 64—65, replaces the former action of the nut and threaded jack screw 20—19.

In Fig. 6 an alternate means for controlling the air motor 33 is diagrammed. In this alternate form a relatively short lever 67 is mounted on the motor valve stem 34 of the air motor 33. The extremity of the lever 67 is hingedly connected to the upper extremity of a floating lever 68. The lower extremity of the floating lever 68 is connected to a first connecting rod 69 which in turn is secured to the bracket arm 37 on the jack screw 19. A second connecting rod 70 is connected to the floating lever 68 intermediate its extremities and extends rearwardly to a reverse lever 71 to be located in the cab of the locomotive. The reversing lever is pivoted at 72 in a toothed segment 73 and is provided with a hand latch 74 by means of which it may be locked in any desired position in the toothed segment 73.

With this construction no indicator is necessary in the cab. The position of the reversing gear can be immediately determined by the position of the reversing lever 71 so the former will follow the positions of the latter. Let us assume that the lever 71 is swung forwardly to the position indicated by the broken line "A." This will cause the connecting rod 70 to swing the upper extremity of the floating lever 68 forwardly since the lower extremity of the floating lever 68 cannot be moved. This upper extremity in swinging forwardly rotates the control lever 67 to cause the motor 33 to operate the jack screw 19 forwardly. This causes the first connecting rod 69 to swing the lower extremity of the floating lever 68 forwardly, the second rod 70 acting as a fulcrum, thus actuating the upper extremity rearwardly to rotate the control lever 67 back to its original "stop" position. The reversing mechanism will now remain at rest until the reversing lever 71 is again moved either forwardly or backwardly. Therefore, the reversing lever 71 remains as set and does not return to neutral as in the previously described form.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A power reversing device for attachment to the fork lever of a locomotive for actuating the reversing gear comprising: an actuating shaft connected at one extremity to said fork lever; a fluid pressure actuated motor; a motor shaft arranged to be rotated by said motor; means for converting the rotary movement of said motor shaft into longitudinal movement of said actuating shaft; a control lever controlling the operation and direction of said motor; manual means for actuating said control lever; mechanical means for returning said control lever to its neutral position upon the completion of a desired movement of said actuating shaft; a manual means for reciprocating said actuating shaft; fluid pressure actuated means for connecting either said motor shaft or said latter manual means to said actuating shaft; and valve means operable from said pressure actuated means to admit fluid pressure to said motor only when said motor shaft is operatively connected to said actuating shaft.

2. In a locomotive reversing gear of the type having an actuating shaft reciprocated by rotation of a threaded nut thereon and having nut rotating means, means for actuating said nut rotating means either mechanically or manually comprising: a fluid pressure motor; a power drive gear; a manually rotatable gear; a shifting gear connected with said nut rotating means; a fluid pressure actuated piston operatively connected with said shifting gear to move the latter into mesh with said power drive gear; spring means acting against said piston to return said shifting gear into mesh with said manually rotatable gear; a conduit supplying fluid pressure to said motor; and valve means in said conduit operable from said piston to admit fluid pressure to said motor only when the latter is operatively connected to said nut rotating means.

3. A power reversing device for attachment to the fork lever of a locomotive for actuating the reversing gear comprising: an actuating shaft connected at one extremity to said fork lever; a motor; a motor shaft arranged to be rotated by said motor; a control lever controlling the operation and direction of said motor; manual means for actuating said control lever; and mechanical means for returning said control lever to its neutral position upon completion of a desired movement of said actuating shaft; a motor drive gear operated by said motor shaft; a manually operated drive gear; a shifting gear; a piston operatively connected to said shifting gear; a pressure cylinder surrounding said piston; means for introducing pressure into said cylinder to cause said piston to shift said shifting gear into mesh with the motor drive gear; resilient means for returning said piston so as to place said shifting gear in mesh with said manually operated drive gear; means for converting the rotary movement of said shifting gear into longitudinal movement of said actuating shaft; a valve means operable from said piston to admit fluid under pressure to said motor for driving purposes only after said shifting gear is in mesh with said motor drive gear.

4. A power reversing device for attachment to the fork lever of a locomotive for actuating the reversing gear comprising: an actuating shaft connected at one extremity to said fork lever; a motor; a motor shaft arranged to be rotated by said motor; a control lever controlling the operation and direction of said motor; manual means for actuating said control lever; and mechanical means for returning said control lever to its neutral position upon the completion of a desired movement of said actuating shaft; a motor drive gear operated by said motor shaft; a manually operated drive gear; a shifting gear; a piston operatively connected to said shifting gear; a pressure cylinder surrounding said piston; means for introducing pressure into said cylinder to cause said piston to shift said shifting gear into mesh with the motor drive gear; resilient means for returning said piston so as to place said shifting gear in mesh with said manually operated drive gear; and means for converting the rotary movement of said shifting gear into longitudinal movement of said actuating shaft; a port in the wall of said cylinder normally covered by said piston; a conduit from said port to said motor so that when said piston reaches a position to mesh the shifting gear with the motor drive gear fluid under pressure will be released from said cylinder through said port to said motor for driving purposes.

5. A power reversing device for attachment to the fork lever of a locomotive for actuating the reversing gear comprising: a horizontally extending, reciprocably-mounted threaded jack shaft connected to said fork lever; a nut gear threaded on said shaft; means for preventing lateral shifting of said nut gear so that rotation thereof will move said jack shaft longitudinally; a fluid pressure motor; mounted to rotate said nut gear in either desired direction; a valve shaft controlling the operation and direction of operation of said motor; a control lever mounted on said valve shaft; a floating lever connected at its one extremity to said control lever and at its other extremity to said jack screw; manual means connected to said floating lever intermediate the extremities of the latter for swinging it about the latter extremity; and means for locking said manual means so as to provide a fulcrum for said floating lever to allow said jack screw to operate said control lever; and pressure-operated means for effecting a connection between said motor and said nut gear; and means for delivering fluid under pressure to said motor in consequence of the operation of said latter pressure operated means.

6. In a pressure-operated reversing device for locomotives of the type having a rotatable shaft for accomplishing the reversing function and having a pressure-operated motor and a manual means for rotating said shaft, a drive gear driven by said motor; a manual gear rotatable by said manual means; a shifting gear splined in said shaft; a pressure cylinder; a piston in said cylinder connected with said shifting gear to shift the latter along said shaft into mesh with said drive gear; a spring acting against said piston to shift said shifting gear into mesh with said manual gear when said piston is inoperative; a conduit supplying fluid pressure to said motor; and valve means in said circuit actuated by said piston for preventing fluid pressure from flowing to said motor until said shifting gear has engaged the drive gear of said motor.

7. Means for reciprocating a shaft comprising: a nut threaded on said shaft; means for preventing longitudinal movement of said nut; a drive shaft connected with said nut for rotating the latter; a fluid actuated motor; a drive gear driven by said motor; a manually rotatable gear; a shifting gear splined on said drive shaft so that it may be brought into mesh with either said power gear or said manual gear; a pressure cylinder aligned with said drive shaft; a piston in said pressure cylinder; a shaft sleeve extending from said piston to said shifting gear so that when fluid pressure enters said cylinder, said piston will force said shifting gear into mesh with said motor drive gear; a spring acting against said piston for returning said shifting gear into mesh with said manual gear when said fluid pressure is released; a port in said cylinder adapted to be opened by said piston when said shifting gear has engaged said power gear; and a conduit extending from said port to said fluid-operated motor to energize the latter when said port is uncovered.

WILLIAM F. TRIPLETT.

REFERENCES CITED

The following references are of record in the file of this patent:

UNITED STATES PATENTS

| Number | Name | Date |
|---|---|---|
| 789,836 | Bodenlos | May 16, 1905 |
| 790,968 | McCarroll | May 30, 1905 |
| 1,477,557 | Guenst | Dec. 18, 1923 |
| 1,479,440 | Abele | Jan. 1, 1924 |
| 1,682,888 | Craig | Sept. 4, 1928 |
| 1,847,693 | Kindervater | Mar. 1, 1932 |
| 1,850,392 | Haas | Mar. 22, 1932 |
| 1,891,545 | Kindervater | Dec. 20, 1932 |
| 2,064,051 | Allard | Dec. 15, 1936 |
| 2,166,206 | Benson | July 18, 1939 |
| 2,352,140 | Trott | June 20, 1944 |

FOREIGN PATENTS

| Number | Country | Date |
|---|---|---|
| 20,202 | Great Britain | Aug. 26, 1915 |